United States Patent [19]
Dory et al.

[11] Patent Number: 5,502,686
[45] Date of Patent: Mar. 26, 1996

[54] METHOD AND APPARATUS FOR IMAGING A BOREHOLE SIDEWALL

[75] Inventors: Efraim Dory, Kingston upon Thames; Martin Evans, Norwich, both of England; Albert A. Alexy, Katy, Tex.

[73] Assignee: Western Atlas International, Houston, Tex.

[21] Appl. No.: 283,840

[22] Filed: Aug. 1, 1994

[51] Int. Cl.[6] .................................................. G01V 1/00
[52] U.S. Cl. ........................... 367/34; 367/86; 181/105; 175/40; 175/50; 73/151; 324/323; 324/351; 324/355; 324/366
[58] Field of Search ................................. 367/34, 37, 86; 181/105; 175/40, 50; 166/250; 73/151; 324/323, 351, 355, 366

[56] References Cited

U.S. PATENT DOCUMENTS

| | | | |
|---|---|---|---|
| 4,468,623 | 8/1984 | Gianzero et al. | 324/367 |
| 4,567,759 | 2/1986 | Ekstrom et al. | 73/152 |
| 4,692,908 | 9/1987 | Ekstrom et al. | 367/27 |
| 5,008,625 | 4/1991 | Chen | 324/351 |

*Primary Examiner*—J. Woodrow Eldred
*Attorney, Agent, or Firm*—William A. Knox

[57] ABSTRACT

A method for concurrently gathering acoustic and resistivity data for mapping the texture of the sidewall of a borehole using a single imaging tool. The data are sampled, formatted and merged to provide a single composite image of the borehole sidewall.

16 Claims, 8 Drawing Sheets

METHOD AND APPARATUS FOR IMAGING A BOREHOLE SIDEWALL

BACKGROUND OF THE INVENTION

1. Field of the Invention

A tool for mapping the texture and composition of the formation that comprises the sidewall of a borehole. The tool combines the attributes of a resistivity-type borehole imager with the benefits of a circumferential sidewall acoustic imager in a single sonde.

2. Discussion of Related Art

After an oil or gas borehole has been drilled into the earth, it is of interest to the geologist to study the texture and composition of the formations that make up the borehole sidewall. The term "texture" includes, but is not limited to, visible surface features such as cracks, faults, dip of the strata, rugosity, vugs and macro-crystalline structure, as well as the physical and chemical composition of the rock. Ideally, if the borehole fluid were clear water or air, one could lower a television camera into the hole and circumferentially scan the sidewall as the camera is raised back to the surface, thereby mapping visible features of the sidewall in two dimensions. Unfortunately, the drilling mud used during the drilling of the borehole is opaque to optical illumination. Techniques for imaging the sidewall texture in the presence of opaque drilling mud include, among others, electrical and acoustic methods, each of which has its own advantages.

For convenience in the ensuing discussion, but not to be considered in any way limiting, a distinction will be made between the terms "logging" and "imaging" or "imagery". A logging tool is designed to define the gross lithologic boundaries penetrated axially by the borehole without particular indication of circumferential variations. Usually the instrumentation used in a logging tool can penetrate relatively deeply into the formations that make up the borehole sidewall. Imaging tools, on the other hand, are intended to furnish a picture of the texture of the exposed sidewall surface with little or no penetration into the formation.

Electrical resistivity methods are useful in the presence of conductive drilling muds and particularly in circumstances where the different formation rock types have the same acoustic impedance. In the presence of highly resistive rocks or drilling fluids, spontaneous potential (SP) measurements may be employed. Acoustic methods are preferred with highly resistive oil base muds or where there is a low conductivity contrast between two formations. Acoustic illumination is capable of detecting micro-cracks due to drilling stresses imparted to the rock formation that an electrical tool cannot see or can see only imperfectly. As will be explained later, where applicable, acoustic methods provide continuous circumferential imagery of the borehole sidewall whereas electrical methods can only provide discontinuous segmental coverage.

A typical acoustic televiewer circumferentially scans continuously the sidewall at 6 revolutions per second, acoustically illuminating the sidewall 250 times per scan to provide an equal number of acoustic measurement samples per revolution while being drawn up the borehole at a uniform rate of 10 feet per minute. The resulting image is a function of the acoustic reflectivity of the sidewall. The vertical resolution is about 0.3 inch. One such device is taught in U.S. Pat. No. 5,179,541, issued Jan. 12, 1993 to V. C. Weido, assigned to the assignee of this invention.

Resistivity tools, which are generically different from acoustic imagers, consist of a plurality of arrays of electrodes, usually 24–32 per array, that are mounted on several pads, usually four to twelve. The pads with the electrodes are pressed against the borehole sidewall by spring-loaded or hydraulically-actuated expandable arms. A potential difference is established between a common electrode on the tool and the respective electrodes of the arrays on the pads and observed in a desired measurement sampling sequence. Variations in the measured potential or the measured current as a function of depth are a measure of the electrical resistivity (or the inverse, the conductivity) of the formation. Variations in resistivity may be displayed to provide a visual image of the texture of a segment of the sidewall of the borehole. For example, see U.S. Pat. No. 4,468,623 issued Aug. 28, 1984 to S. C. Gianzero et al.

When a two-dimensional array of electrodes is used in an imaging tool, the vertical elements of the array must be referred to a common depth. The electrical measurements are made at timed intervals. Using the sampling interval as a time base and given a constant tool velocity, depth shifting would be a simple matter. But the velocity of the tool varies due to cable bounce (or "yo-yo" motion) as it is being drawn up the borehole. Therefore an independent depth measuring means is needed which is taught by U.S. Pat. No. 4,567,759, issued Feb. 4, 1986 to M. P. Ekstrom et al. which employs a z-axis accelerometer in combination with a conventional dip-angle sensing device (dipmeter).

U.S. Pat. No. 5,008,625 issued Apr. 16, 1991 to Min-Yi Chan teaches a method and apparatus for measuring in fine detail, the spontaneous potential (SP) around and along a borehole wall. The tool employs electrode arrays mounted on four or more radially-expansible pads much like the pad-mounted electrode arrays of the resistivity tool cited above. The electrodes measure the spontaneous potential (sometimes called the streaming potential), relative to a reference electrode at the surface. The spontaneous potential is caused by fluid movement from the formation into the drilling fluid. This tool is useful in highly resistive drilling muds where a resistivity tool is ineffective. However, the SP tool has certain disadvantages due to noise caused by electrode polarization and stray currents created by unwanted bimetallic junctions.

U.S. Pat. No. 4,692,908, issued Sep. 8, 1987 to M. K. Ekstrom et al. teaches use of an acoustic transducer for measuring the stand-off between an array of resistivity-measuring buttons on the tool and the borehole sidewall. That technique is also used to measure the thickness of the mud cake on the borehole wall.

All pad-mounted electrode arrays as above described, necessarily have a fixed finite circumferential width. Because of their fixed width, the angular coverage of each array around the sidewall is inversely proportional to the borehole diameter. Therefore, the visual imagery display of the borehole sidewall provided by the electrical tools is necessarily presented in the form of a series of strip segments equal in number to the number of pads. The segments are isolated from each other by gaps of missing data, the angular widths of which gaps depend upon the borehole diameter.

Borehole tools of the type described must be properly oriented so that the grain of the structural images can be related to the areal geology. It is well known in the art to equip the imaging tools with magnetometers for defining the axial alignment of the tool with respect to magnetic north and accelerometers for defining the alignment of the tool with respect to gravity. Alternatively, an inertial guidance system may be provided for tracking the direction of the drill bit in deviated holes.

In the past, it has been known to survey a borehole using different tools during separate imaging runs, particularly where the tools are generically different such as electrical tools versus acoustic tools. A purpose for using separate imaging tools is, of course, to use acoustic data to fill in the gaps between the segmental coverage of the electrical data. One reason for separate tool runs was due in part to the problems arising from use of measurement devices of different genera that are characterized by different scanning and data-sampling rates, incompatible power-supply needs and different dynamic ranges of the measured data values.

The difficulty that arises using physically separate runs is to correlate precisely the imagery resulting from the acoustic data with the imagery resulting from the electrical data with respect to azimuth, borehole inclination and depth, as obtained from the two or more independent runs. That difficulty arises because of the vagaries of different timing bases, different hoisting cables that have different stretch coefficients and other well-known variables. Although it is known to provide several different species of devices on a single sonde for measuring selected petrophysical characteristics, the devices were generically similar such as particle counters for neutron, gamma-ray and $N^{16}$ studies. Similarly, resistivity, self-potential and induction loggers belong to the same genus. A third type of logger incudes velocity-measuring sondes of various types.

There is a need for a means to furnish acoustic imagery continuity across the gaps between the segmented images provided by electrical tools and to provide a single tool that combines the desirable features of both electrical and acoustic imaging techniques with a minimum distance of axial separation between the various imaging sensors.

SUMMARY OF THE INVENTION

In accordance with this invention, there is furnished a sidewall imaging system for deployment in a borehole that penetrates a plurality of earth formations. The system includes a first component for imaging the sidewall texture as a function of the acoustic reflectivity of the rock formations penetrated by the borehole. A second component includes a means for concurrently imaging the borehole sidewall as a function of the resistivity of the exposed rock formations in the form of a plurality of image segments. In one combination, processing circuitry combines the reflectivity image with the resistivity image by superimposing the resistivity image over the acoustic reflectivity image.

In an alternative combination, the acoustic reflectivity image is merged with the resistivity image.

In a further aspect of this invention, selected portions of the acoustic reflectivity image are interpolated between the segments of the resistivity image.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
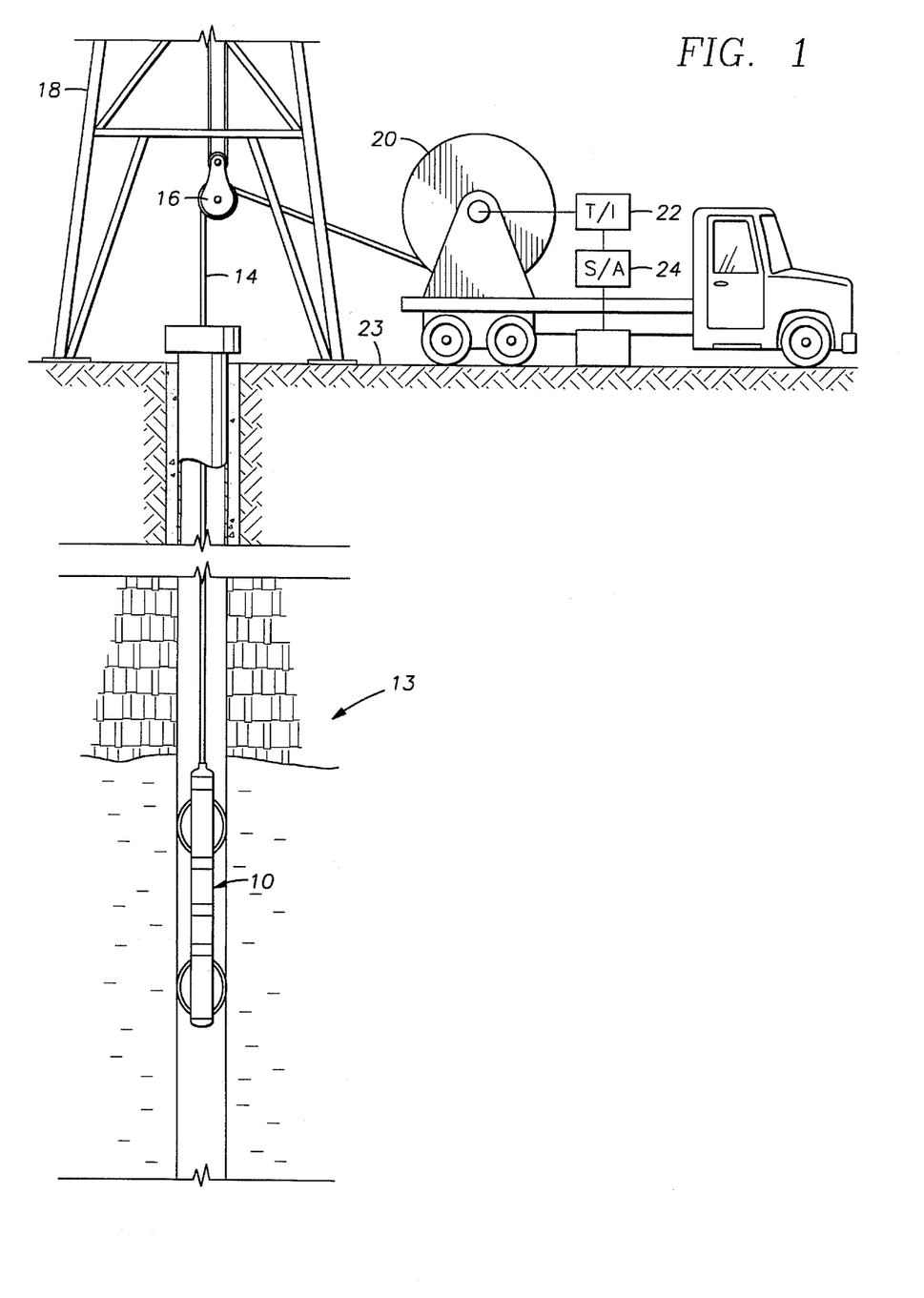
FIG. 1 shows the imaging tool of this invention suspended in a borehole.

FIG. 1 shows a composite imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives digital data back which may be recorded on an archival storage medium of any desired type for concurrent or later processing. Data processor means 24, such as a suitable computer, may be provided for performing data analysis in the field in real time or the recorded data may be sent to a processing center or both for post processing of the data.

Figure 2:
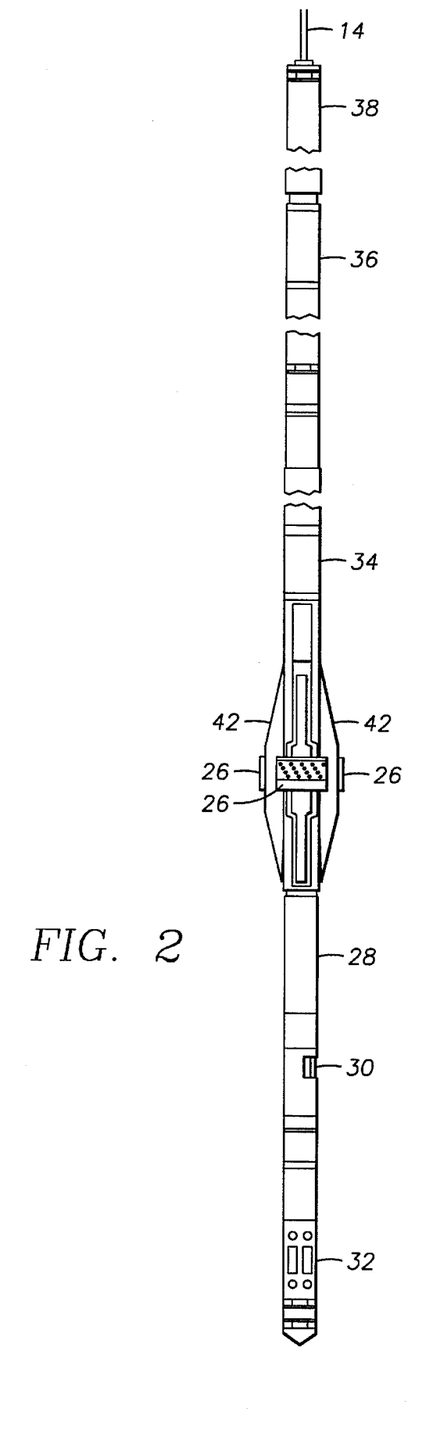
FIG. 2 is a mechanical schematic view of the imaging tool.

FIG. 2 is a schematic external view of the unified borehole sidewall imager system. The tool 10 comprising the imager system consists essentially of four components: 1) resistivity arrays 26; 2) electronics modules 28 and 38; 3) a mud cell 30; and 4) a circumferential acoustic televiewer 32. All of the components are mounted on a mandrel 34 in a conventional well-known manner. The outer diameter of the assembly is about 5.4 inches and about five feet long. An orientation module 36 including a magnetometer and an inertial guidance system is mounted above the imaging assemblies 26 and 32. The upper portion 38 of the tool 10 contains a telemetry module for sampling, digitizing and transmission of the data samples from the various components uphole to surface electronics 22 in a conventional manner. Preferably the acoustic data are digitized although in an alternate arrangement, the data may be retained in analog form for transmission to the surface where it is later digitized by surface electronics 22.

Figure 2A:
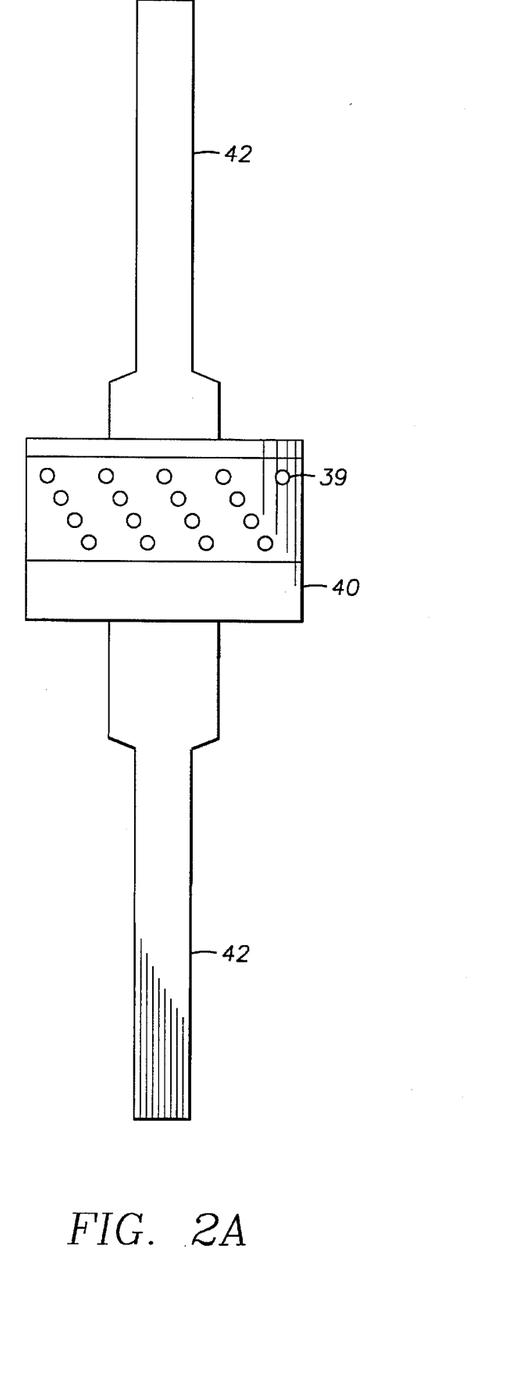
FIG. 2A is a detail view of an electrode pad.

Also shown in FIG. 2 are three resistivity arrays 26 (a fourth array is hidden in this view). Referring to FIGS. 2 and 2A, each array includes 32 electrodes or buttons identified as 39 that are mounted on a pad such as 40 in four rows of eight electrodes each. Because of design considerations, the respective rows preferably are staggered as shown, to improve the spatial resolution. For reasons of clarity, less than eight buttons are shown in FIG. 2A. For a 5.375" diameter assembly, each pad can be no more than about 4.0 inches wide. The pads are secured to extendable arms such as 42. Hydraulic or spring-loaded caliper-arm actuators (not shown) of any well-known type extend the pads and their electrodes against the borehole sidewall for resistivity measurements. In addition, the extendable caliper arms 42 provide the actual measurement of the borehole diameter as is well known in the art. Using time-division multiplexing, the voltage drop and current flow is measured between a common electrode on the tool and the respective electrodes on each array to furnish a measure of the resistivity of the sidewall (or its inverse, conductivity) as a function of azimuth.

Resistivity measurements are made at 166-millisecond sampling intervals (scan cycle) as the tool 10 is raised in the bore hole at a preferred speed of 1.5 to 10 feet per minute. During a resistivity scan cycle, all 128 electrodes of the four pads are scanned sequentially.

It is evident from the drawing that 360° electrical imaging of the sidewall is possible only when the diameter of the borehole is substantially the same as that of the multiple pad assembly. Otherwise, the coverage is segmental with the radial extent of each pad segment, relative to the circumference of the sidewall, being inversely proportional to the hole diameter. The borehole diameter may be mechanically measured by the caliper arms 42 using well-known circuitry such as potentiometers associated therewith.

The electronics package for servicing the resistivity assembly 26 and the acoustic imager 32, due to design considerations, is preferably mounted between the resistivity assembly and the acoustic televiewer. That location is preferred to prevent the relatively high-powered televiewer triggering-voltage pulses from interfering with the resistivity measurements. However, the axial separation of the resistivity assembly 26 and the acoustic imager 32 must be maintained at a minimum distance as is practicable in order to minimize the required depth-shifting interval between the imaging sensors. The resistivity measurements comprise one selected petrophysical parameter that is characteristic of the borehole sidewall.

A conventional mud cell 30 is mounted in any convenient location on the imaging tool but preferably near the televiewer 32. It consists of a pair of acoustic transducers, or a transducer and a reflector, (not shown) separated by a known distance. The travel time of an acoustic pulse between the transducer or between the transducer and the reflector, is a measure of the fluid slowness. That information is needed for interpreting the televiewer data.

Acoustic televiewer or imager 32 circumferentially scans the borehole sidewall during a run, preferably six times per second at 250 pulses per scan and the imager moves no more than 0.3 inch along the sidewall, thereby providing designated sampling points that are uniformly distributed azimuthally around the circumference of the borehole sidewall along a desired depth interval. The circumferential scan rate of the acoustic televiewer is substantially the same as the circumferential scan rate of the resistivity measurements, that is, one scan per depth interval. The televiewer is coupled to the resistivity module in axial alignment so that it can make acoustic measurements concurrently with resistivity measurements in a known angular orientation. The formation acoustic reflectivity is measured quantitatively as a function of the relative amplitude of the received signal that is reflected from the sidewall. The two-way flight time of an acoustic pulse between the televiewer and the sidewall is a measure of their separation.

Figure 3:
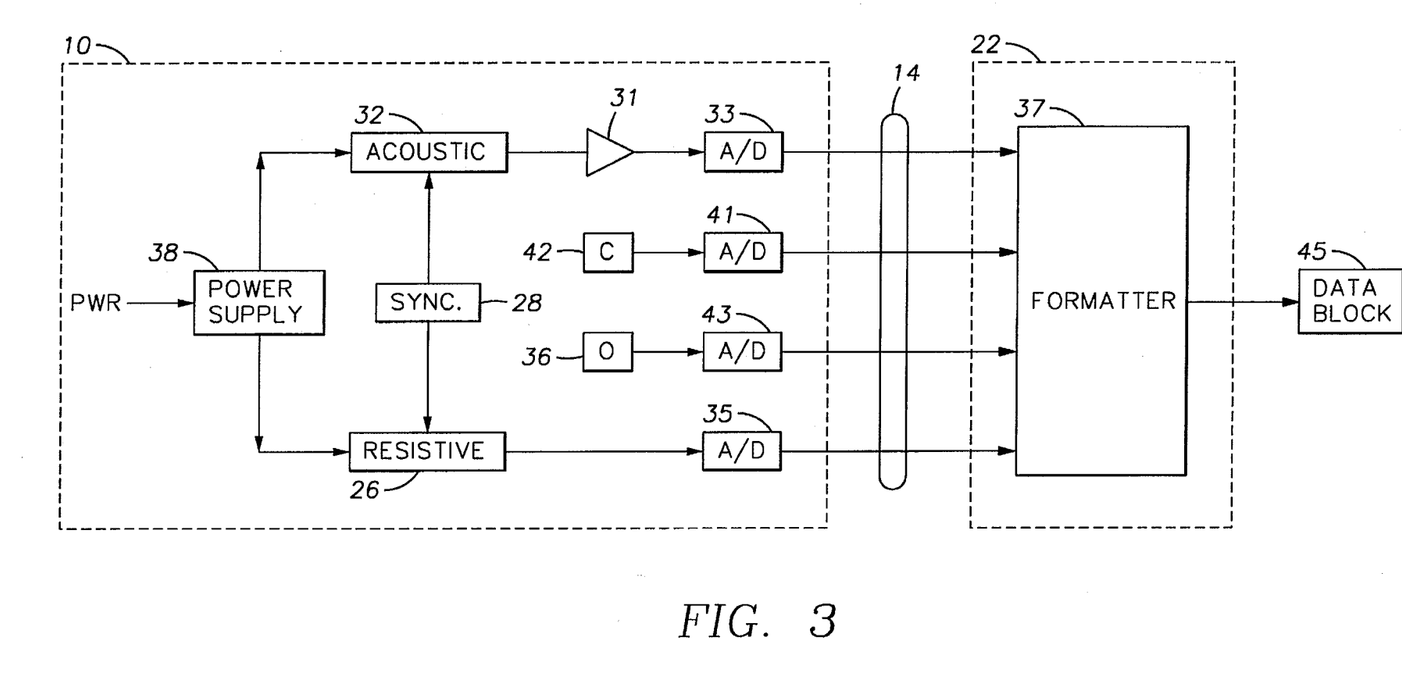
FIG. 3 is a functional block diagram of the electronics package in the imaging tool and the surface controller.

With respect to operation of the imaging tool, refer now to FIG. 3 where dashed box 10 schematically represents sonde-mounted components. Dashed box 22 includes surface components. Acoustic televiewer 32 and the resistivity arrays 26 are powered from a common power supply resident in module 38 which also includes A/D converters 33 and 35. For each 360° scan cycle, acoustic televiewer 32 is triggered by the synchronizer module 28. Acoustic data samples from televiewer 32 are strobed out to amplifier 31 and A/D converter 33 and transmitted up the cable 14 to surface module 22. A corresponding resistivity scan is triggered by synchronizer 28 and resistivity data samples from electrode pads 26 are strobed out to A/D converter 35 and then transmitted concurrently with acoustic data as a serial sample stream up the cable 14 to the surface module 22. Auxiliary data, such as hole diameter and azimuth orientation, originating from caliper arm 42 ("C") and the orientation module 36 ("O"), are also applied to A/D converters 41 and 43, respectively, and then to cable 14 and transmitted to the surface module 22. The acoustic and resistivity and the caliper "C" and orientation "O" data bits are applied to a formatter 37. The acoustic data bits and the resistivity data bits are formatted into a serial data block 45, one block per circumferential scan. Each data block thus contains concurrently-gathered acoustic and resistivity measurements.

Figure 4:
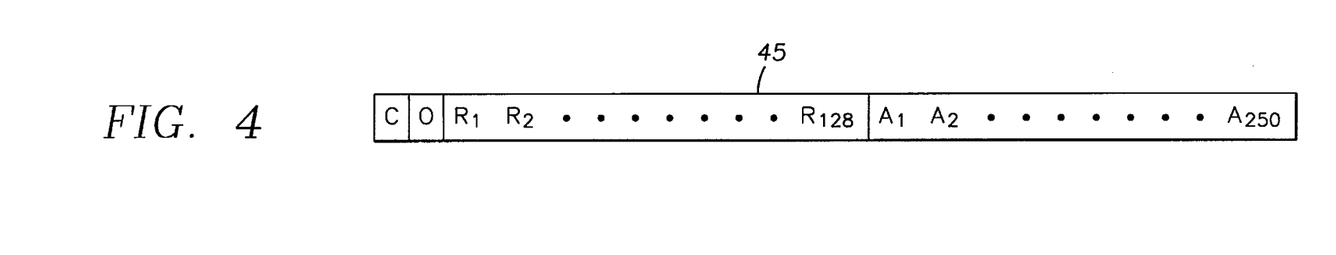
FIG. 4 illustrates the data-block format of the imaging data.

FIG. 4 illustrates the details of a data block 45 for depth interval $D_n$. The data samples from resistivity measurements $R_1, R_2, \ldots, B_{128}$ occupy a first portion of the data block 45 in sample-sequential order. Acoustic samples $A_1, A_2, \ldots, A_{250}$, occupy a second portion of data block 45 also in sample-sequential order. The auxiliary data such as caliper "C" and orientation "O", measured as above described, may be included in the data block as shown. The data blocks may be recorded on raw field tapes or diskettes for later processing as will be shown later with reference to flow diagrams of FIG. 9.

Figure 5:
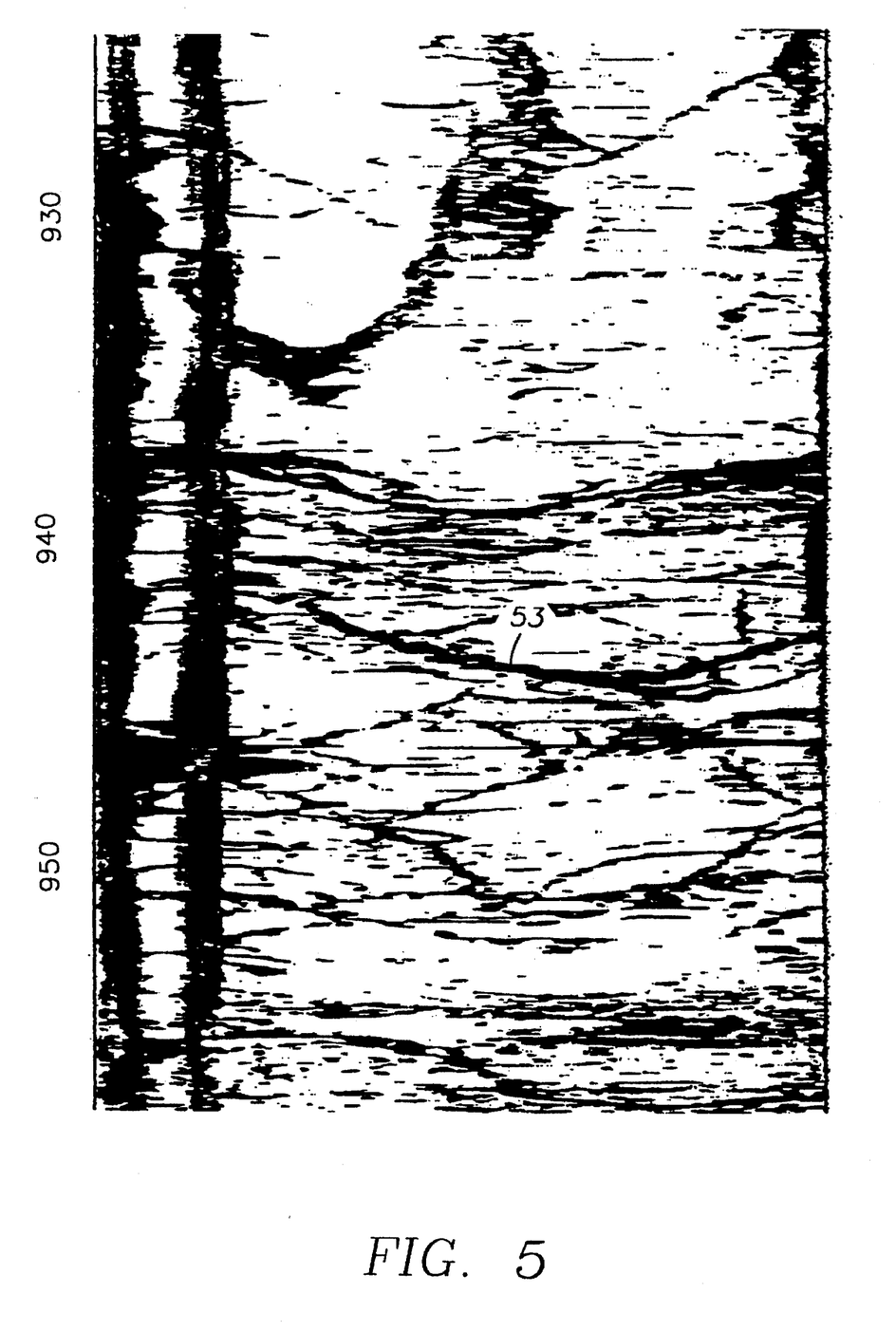
FIG. 5 is a pictorial view of a circumferential acoustic borehole sidewall imaging log taken in accordance with this invention.

The acoustic imager that forms the circumferential borehole imaging system 32 provides 360° sampling of the sidewall acoustic reflectivity data from which a continuous acoustic imaging log or sonogram can be constructed as shown in FIG. 5 to provide a display of the imaged data. The vertical axis of the display is depth measured in meters. The borehole wall is, of course generally cylindrical. Therefore, the display of FIG. 5 is an internal picture or map of the sidewall as it would appear if it were unrolled onto a flat surface. The curvature of event 53 on FIG. 5 is due to the angular attitude of the sidewall feature. The acoustic imager thus comprises a means for concurrently imaging the texture and composition of the sidewall of a borehole in terms of a petrophysical characteristic of the borehole sidewall that is generically different from the petrophysical characteristics revealed by resistivity measurements.

Figure 6:
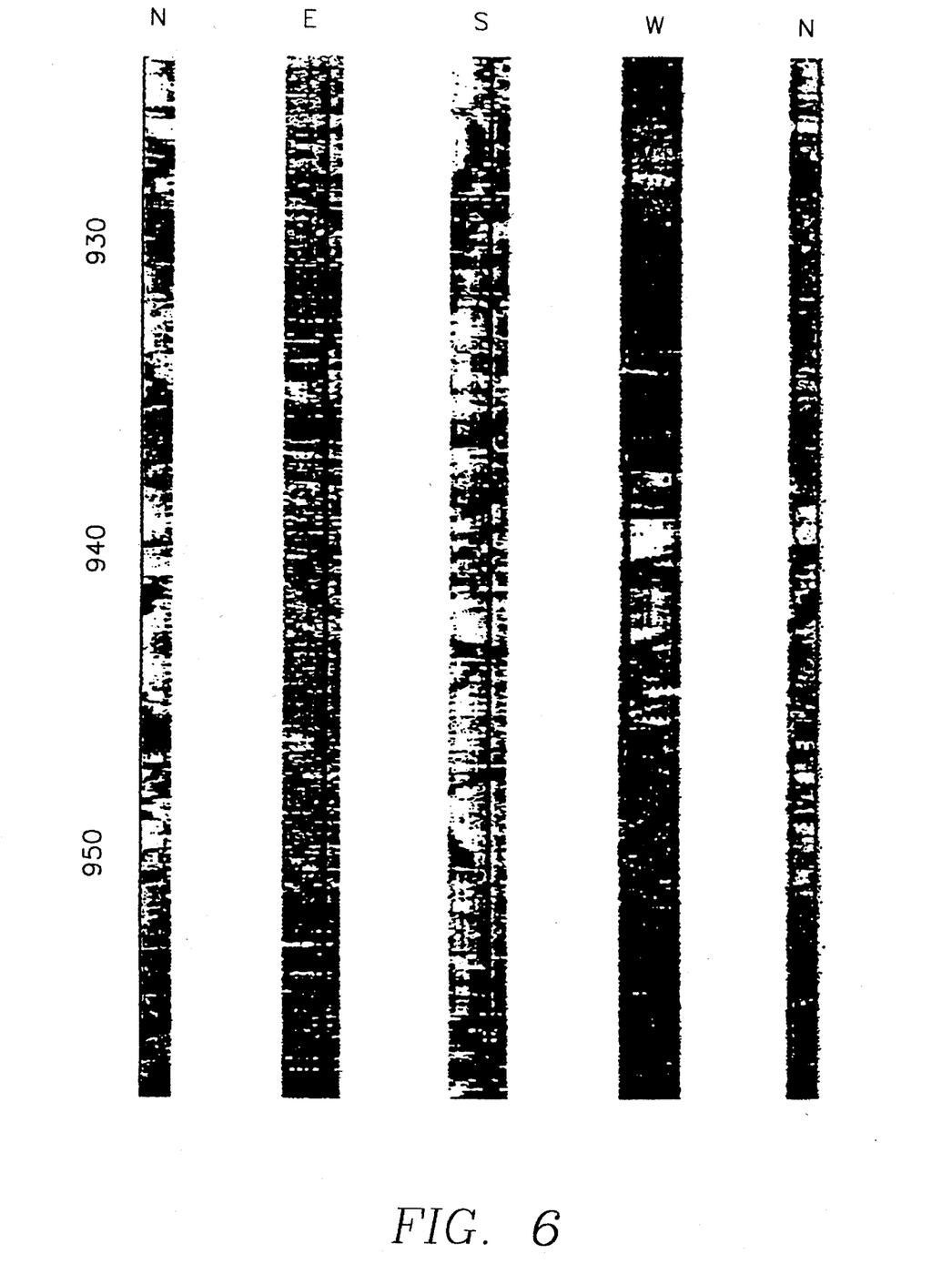
FIG. 6 is a pictorial view of resistivity imaging log segments taken in accordance with this invention.

The resistivity imager arrays necessarily allow sampling only across preselected angular segments of the borehole sidewall. From those data, a resistivity imaging log, consisting of data strips, one strip per array, separated by gaps, can be constructed and displayed as shown in FIG. 6 which forms a display of the imaged resistivity data. The angular width of each data-scan strip is equal to $2 \sin^{-1}\{(S/2)/R\}$, where S is the array width and R is the borehole radius. From left to right, the strips represent measurements directed along azimuths of North, East, South, West and North. Observe that the North segment is split in half, one portion on each side of the display. The azimuthal alignment of the strips corresponds to the azimuthal alignment of the sonogram of FIG. 5.

Certain sampling points will be common in both illumination techniques. Acoustic data and resistivity data from those common sampling points can be processed and combined in various combinations after adjustment for the difference in depth between the two imagers. One such combination is shown in FIG. 7 where the acoustic image has been interpolated between the segments of the raw resistivity image in an physical image overlay arrangement.

Figure 7:
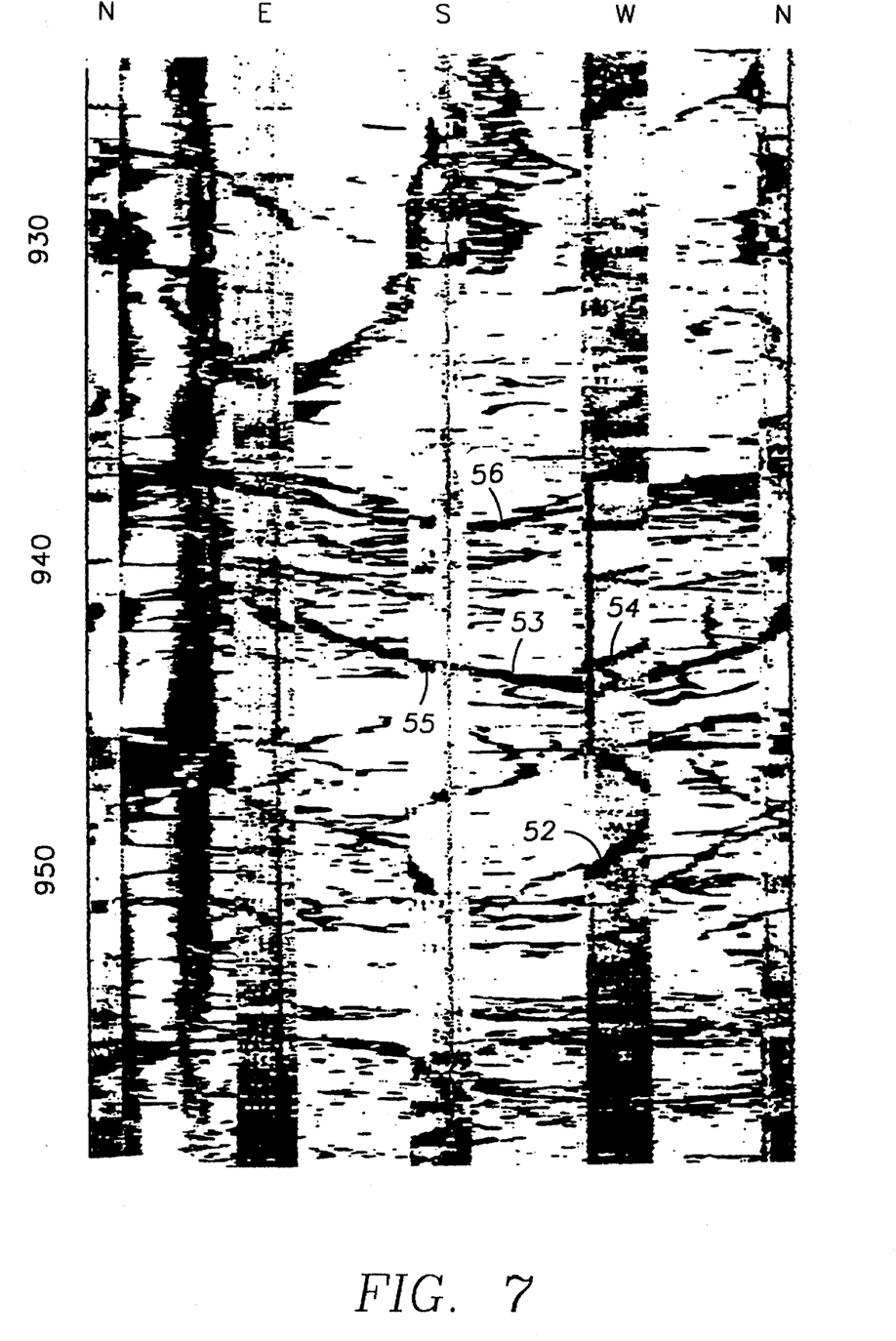
FIG. 7 is a pictorial view of a composite imaging log in accordance with this invention obtained by superimposing the raw resistivity image of FIG. 6 over the acoustic image of FIG. 5.

It is immediately evident from FIG. 7 that a raw resistivity image strip such as the West strip, superimposed over the sonogram, creates apparent shadows over the strong acoustic events such as 53. It is further of interest that there appear to be valid events such as 52 and 54 on the West resistivity strip but which do not appear on the sonogram. However, event 53 on the sonogram clearly carries across the South resistivity strip at 55.

Figure 8:
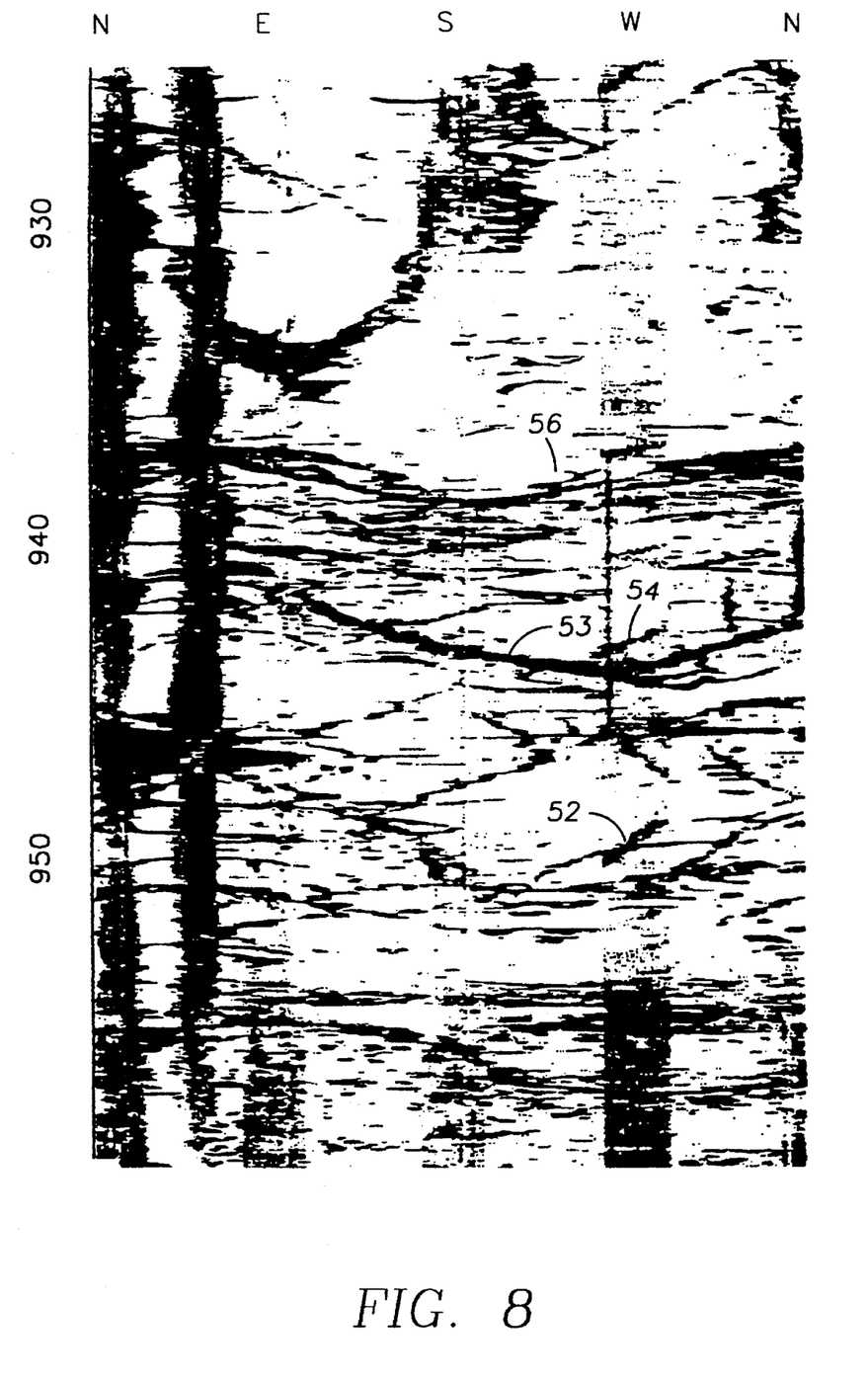
FIG. 8 is a pictorial view of a composite imaging log in accordance with this invention obtained by merging the resistivity image data shown in FIG. 6 with the acoustic image data shown in FIG. 5.

In another more preferable combination, the common data from the two imagers may be merged together in a data processing operation to provide a substantially seamless display as shown in FIG. 8. The particular improvement illustrated by this display is the step of equalizing the dynamic range of the resistivity measurements with respect to the acoustic measurements. That balance is essential in order that the continuity of a displayed textural feature is not distorted when scanning across a resistivity segment of the display, between adjacent acoustic segments. Thus, the continuity of acoustic events 53 of the sonogram images clearly follow across the East, South and West resistivity image strips. Additional detail is revealed in both FIGS. 7 and 8 for event 56 over detail that was seen on the sonogram alone on FIG. 5. In addition to the improved continuity exhibited by the merged display of FIG. 8, the display also clearly shows events that are unique to resistivity measurements such as events 52 and 54.

Figure 9:
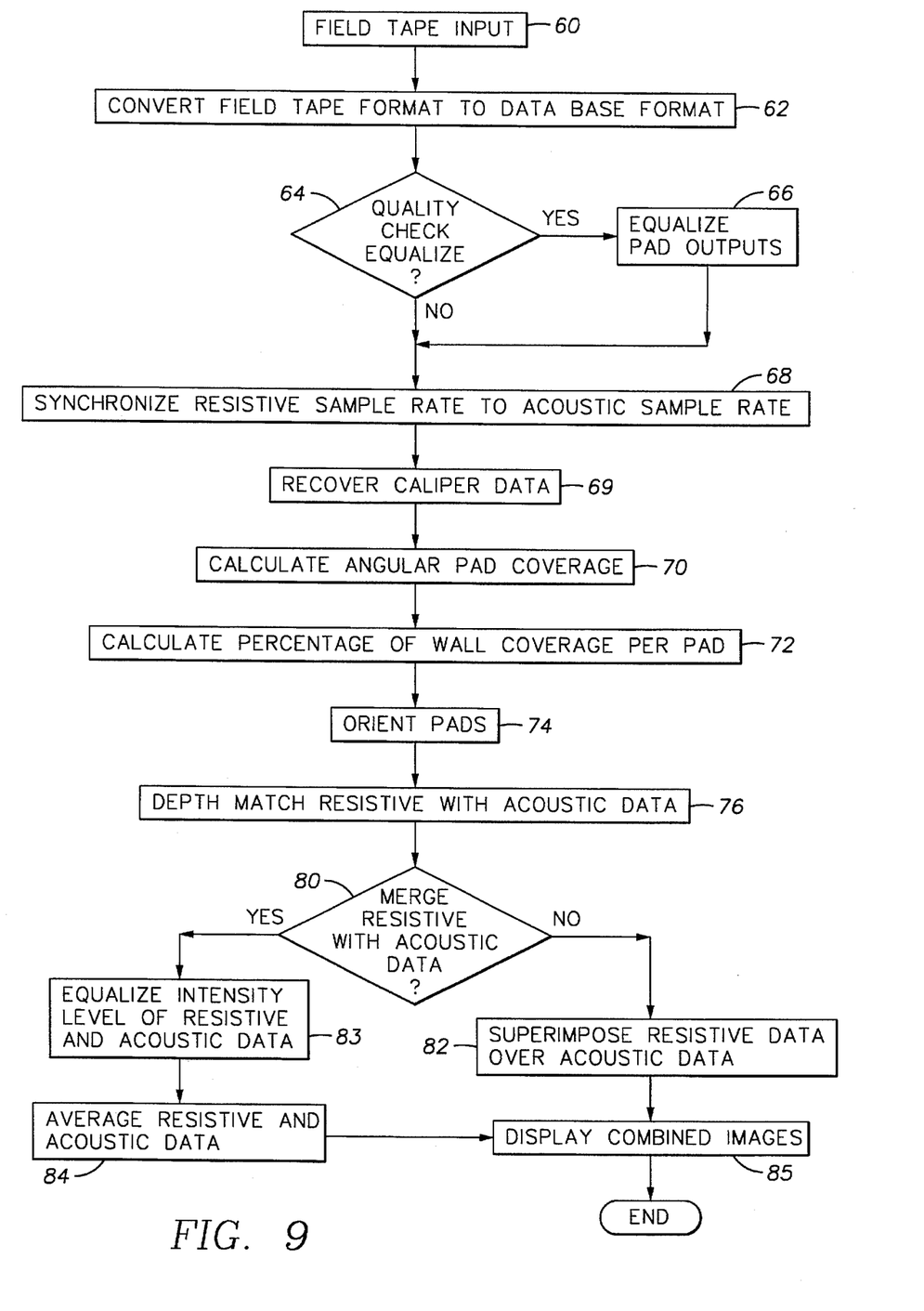
FIG. 9 comprises a flow diagram of the preferred method for processing the combined resistivity and acoustic data.

FIGS. 9–11 comprise a flow diagram of the processing program such as might be used by data processor 24 of any suitable type, for combining the acoustic data with the resistivity data. In FIG. 9, field tapes or diskettes containing the concurrently-acquired acoustic and resistivity data are provided for input to the program at 60. The data blocks include the discrete resistivity data samples, acoustic data samples, caliper data and orientation data as earlier explained. The resistivity and acoustic data are converted from raw field tape format to a desired data base format at step 62 and stored in sample sequential blocks by depth intervals, one data block per 360° scan cycle. Step 64 is a quality-control step for the resistivity data samples. If there is no need for data equalization or repair, the processor proceeds directly from step 64 to step 68, otherwise the resistivity data are first equalized for all pads and all electrode buttons at step 66. At step 68, the circumferential sampling points of the resistivity data are synchronized with the circumferential sampling of the acoustic data. The current borehole diameter as determined from the caliper data "C", is recovered in step 69.

With the aid of the caliper information, the angle subtended by the resistivity electrode pads is calculated at step 70. From 70, the actual percentage of borehole wall coverage is determined at step 72. Information "O" from the magnetometer and from the inertial sensor systems are invoked at step 74 to azimuthally align the respective outputs of the resistivity pads and the acoustic logger with the outside world. Finally, the resistivity data are depth-shifted by any convenient means to match the acoustic-sensor depth at step 76, thereby to provide means for combining those respective resistivity and acoustic data samples that have originated from a common sampling point along the borehole sidewall. A decision is made at step 80 to either superimpose or overlay the resistivity display over the acoustic display as shown in FIG. 7, the simplest process, or to merge the two types of measurements from common sampling points as shown in FIG. 8.

Superposition of the data samples takes place at step 82 and thence, the combined data are displayed at 85 as shown in FIG. 7. If the resistivity and acoustic data samples are to be merged, the optical intensity or gray-span that represents the dynamic range of the discrete resistivity data samples is scaled with respect to the intensity span of the discrete acoustic data samples at step 83. The scaled data samples are then combined in any desired manner, such as by convolution or averaging at step 84. The averaged data are then displayed at step 85 to provide a substantially seamless display of the combined data as shown in FIG. 8. Thus, we have defined a system for imaging the physical characteristics of a borehole sidewall as a function of concurrently-gathered, generically-different petrophysical parameters that are characteristic of the side wall and for combining the imaged data provided by the system into a single image display.

This invention has been described with a certain degree of specificity by way of example only; the exemplary description is in no way to be taken as limiting. This invention is limited only by the appended claims.

What is claimed is:

1. A unitary tool-mounted borehole sidewall imaging system comprising:

first means for circumferentially imaging the physical texture and composition of the sidewall of a borehole along a selected depth interval as a function of the acoustic reflectivity of discrete earth formations penetrated by said borehole to provide a first image;

second means for concurrently imaging the physical texture and composition of said borehole sidewall along said selected depth interval as a function of the resistivity of the discrete earth formations penetrated by said borehole to provide a second image; and means for combining said first and second images.

2. The borehole imaging system as defined by claim 1, wherein:

said means for combining comprises means for merging said first and second images.

3. The borehole imaging system as defined by claim 1, wherein:

said means for combining includes means for combining said first and second images by superposition.

4. The borehole imaging system as defined by claim 1, wherein:

said second means for concurrently imaging includes means for imaging preselected angular segments of said borehole sidewall, and said means for combining includes means for interpolating desired portions of said first image between said angular segments of said second image.

5. A method for imaging the sidewall of a borehole that has penetrated a plurality of discrete earth formations, comprising:

circumferentially acoustically mapping said borehole sidewall continuously along a preselected depth interval to provide a first display;

concurrently electrically mapping said borehole sidewall continuously along said preselected depth interval to provide a second display;

combining said first and second displays to form a substantially seamless display of selected physical characteristics of the discrete earth formations penetrated by said borehole along said preselected depth interval.

6. The method as defined by claim 5, wherein:

the step of combining includes the step of merging.

7. The method as defined by claim 5, wherein:

the step of combining includes the step of superpositioning.

8. A method for imaging the sidewall of a borehole that has penetrated a plurality of earth formations having differing characteristics, comprising:

providing a first borehole sidewall image by measuring the acoustic reflectivity of the earth formations penetrated by said borehole at designated sampling points that are uniformly distributed azimuthally around the circumference of said borehole and vertically along a desired depth interval;

providing a second borehole sidewall image by concurrently measuring the electrical resistivity of the earth formations penetrated by said borehole at those preselected sampling points that are common to said designated sampling points;

combining said first and second borehole sidewall images.

9. The method as defined by claim 8, wherein:

said step of combining includes the step of merging said first borehole sidewall image with said second borehole sidewall image.

10. The method as defined by claim 8, wherein:

said step of combining includes the step of superimposing said second borehole sidewall image over said first borehole sidewall image.

11. The method as defined by claim 8, comprising:

defining borehole sidewall image segments by using electrical measurements derived only from said common sampling points;

interpolating portions of said first borehole sidewall image between said borehole sidewall image segments.

12. A borehole imaging tool comprising:

first means for imaging the physical texture and composition of the sidewall of a borehole as a function of a first selected petrophysical characteristic of said side wall;

second, generically different, means for concurrently imaging the physical texture and composition of said sidewall as a function of a second selected petrophysical characteristic of said sidewall; and means for combining said first and second imaged petrophysical characteristics that are derived from a common sampling point to provide a single image display.

13. The borehole imaging tool as defined by claim 12, wherein said first and said second means for imaging are coupled together in axial alignment.

14. The borehole imaging system as defined by claim 1, wherein said first and second means for imaging are coupled together in axial alignment.

15. The method for imaging the sidewall of a borehole as defined by claim 9, wherein the step of merging includes the steps of equalizing the dynamic range of said first and second discrete images and averaging the data samples from common sampling points.

16. A composite display of the physical texture and structure of a borehole sidewall as produced by the system of claims 2 or 4.

* * * * *